Sept. 8, 1942.  L. L. FULLER  2,294,900
GUM MASSAGE APPLIANCE
Filed July 17, 1940
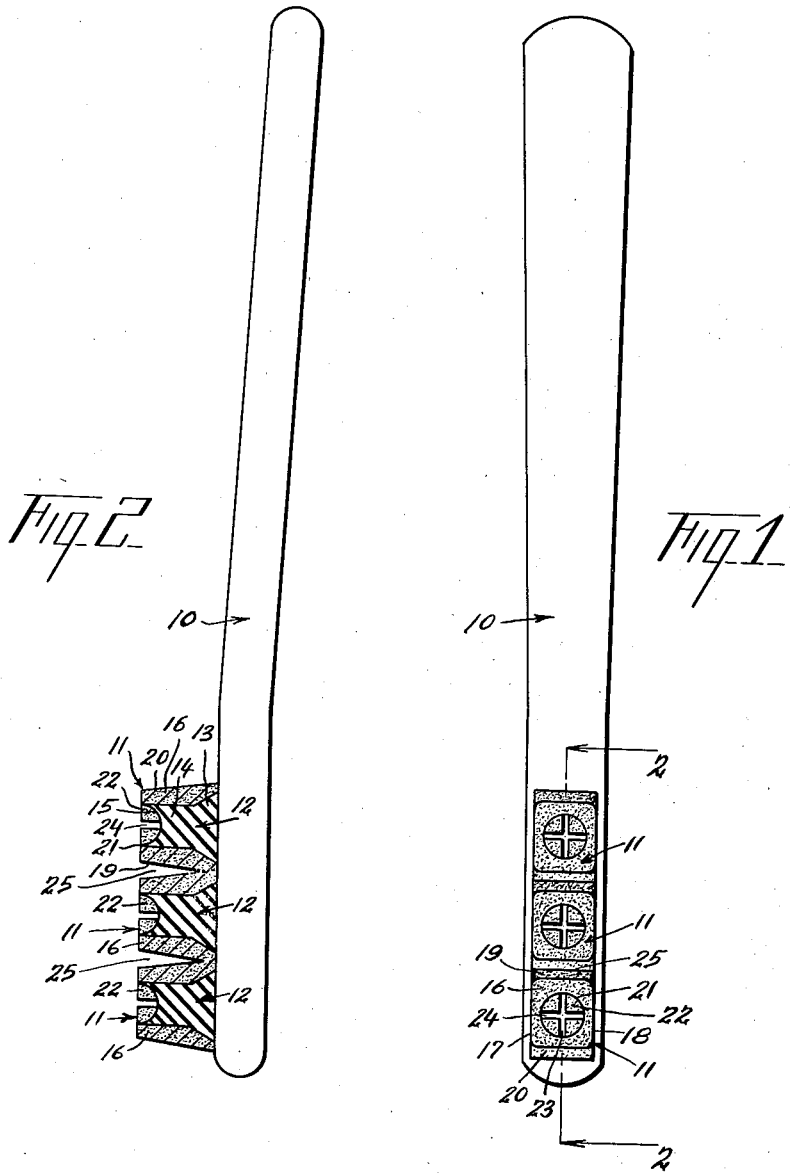
Leslie L. Fuller
INVENTOR
BY Carl Miller
ATTORNEY Patented Sept. 8, 1942

2,294,900

UNITED STATES PATENT OFFICE 2,294,900

GUM MASSAGE APPLIANCE

Leslie L. Fuller, Goldfields, Saskatchewan, Canada

Application July 17, 1940, Serial No. 345,893

1 Claim. (Cl. 128—62)

This invention relates to improvements in gum massaging appliances, and constitutes an improvement on my prior Patent No. 2,217,439, issued to me on Oct. 8, 1940.

A gum massage appliance of one character comprises a row of flexible cups attached to a handle. These flexible cups, when properly used to massage gum tissue, have the advantage of the well known "cupping" action, through the establishment of suction by partial vacuum. Such flexible cups usually made of velum rubber, when used for gum massage, have, however the following disadvantages, i. e., they constitute poor vehicles for carrying and massaging-in medicaments, when wet by saliva they are slippery and difficult to use for efficient massage, and lastly even velum rubber is oftentimes too harsh for highly inflamed, tender gum tissue.

It is accordingly the principal object of this invention to encase each of the flexible cups of a gum massaging appliance as above indicated in a sheath of sponge-rubber which due to its absorbent properties is an excellent vehicle for carrying medicaments, and further, because sponge rubber when wet is not slippery and also because it possesses a velvet softness which makes it an ideal contact surface for gum massage appliances. By combining sponge rubber with the velum rubber cups there is obviated the disadvantages of velum rubber while retaining the advantages of sponge rubber as above indicated.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein:

Figure 1 is a plan view of the gum massaging appliance.

Figure 2 is a longitudinal vertical sectional view of the gum massaging appliance; taken on line 2—2, Figure 1.

Referring to the drawing, 10 denotes the handle of a gum massaging appliance shaped somewhat in the form of a conventional tooth brush handle, on the forward end of which is mounted a row of gum massaging elements 11, and which are fixed to said handle in any desired manner (not shown).

As each of the massaging elements are identical a detailed description of one will suffice. Thus, each massaging element is formed of a core 12 made preferably of velum rubber shaped to define a base 13 and an integral upstanding column 14. Preferably the base 13 is made in the form of a truncated cone while the column 14 is made cylindrical. Obviously both the base 13 and column 14 may be given any other desired shape. At its upper end the column 14 is provided with a cup-shaped concavity or recess 15 which may be of any suitable depth. The column 14 should be of such a length as to provide a requisite amount of flexibility thereof on its base 13 in all lateral or radial directions relative thereto.

Encasing the core 12 is a sheath 16 of sponge rubber shaped to provide parallel side wall surfaces 17 and 18 and downwardly inclined end wall surfaces 19 and 20. The sponge rubber sheath 16 terminates in a plane flush with the lip or edge 21 of the column cup 15, and also provided within said cup to completely fill the same to the level of said plane is a sponge rubber filler 22. Both the sponge rubber sheath 16 and sponge rubber filler 22 are permanently secured to the velum ruber core as by bonding or vulcanization in the manner well known. The sponge rubber filler 22 is divided by diametrical slots 23 and 24 arranged at right angles to each other, said slots extending down to the bottom of the cup-shaped cavity 15, for a purpose to be hereinafter described.

The above described massaging elements 11 are disposed in juxtaposed relation and in longitudinal alignment, see Fig. 1, such that the opposed inclined walls of adjacent massaging elements will define a V-shaped space 25 therebetween, thus establishing each massaging element in independent relation to the other.

In use, the gum massaging elements 11 may be dipped into a medicament which is absorbed by the sponge rubber sheath 16 and sponge rubber filler 22. While in the massaging action on the gums only the sponge rubber comes into contact therewith, nevertheless, the desired vacuum or cupping action is permitted as the lips 21 of the cup-shaped cavities 15, lie in the end plane of the sponge rubber sheaths and in addition by virture of the slots 23 and 24, said cavities are thus enabled to engage the gums to effect the vacuum action and the stimulation of said gums as an incident thereto.

Having thus set forth and disclosed the nature of this invention, what is claimed is:

A gum massaging appliance comprising a row of like massaging elements each jointed at their base to a supporting handle, each massaging element comprising a flexible rubber core surrounded by a sheath of sponge rubber defining parallel side walls and end walls inclined downwardly and outwardly with reference to said supporting handle, said flexible rubber core comprising a truncated conical base and an integral cylindrical column co-axial therewith, said core having a cup-shaped cavity in the free end of said column, each cavity terminating in a thin peripheral edge or lip, a sponge rubber filler in said cavity divided by a plurality of intersecting grooves extending downwardly from the top thereof to the bottom of said cup-shaped cavity, both said sponge rubber sheath and said sponge rubber filler terminating substantially in the plane of said lip or peripheral edge of said cup-shaped cavity, and said massaging elements being arranged on said supporting handle in juxtaposed aligned relation such that opposed end walls of adjacent massaging elements will define a V-shaped space therebetween.

LESLIE L. FULLER.